US009080680B2

(12) United States Patent
Minato et al.

(10) Patent No.: US 9,080,680 B2
(45) Date of Patent: Jul. 14, 2015

(54) SEISMICALLY ACTIVATED GAS SHUT-OFF VALVE

(71) Applicant: Little Firefighter Corporation, Santa Ana, CA (US)

(72) Inventors: Tod Minato, Huntington Beach, CA (US); Ezra Kent, Costa Mesa, CA (US); Rafael Quintana, Anaheim, CA (US)

(73) Assignee: Little Firefighter Corporation, Santa Ana, CA (US)

( * ) Notice: Subject to any disclaimer, the term of this patent is extended or adjusted under 35 U.S.C. 154(b) by 167 days.

(21) Appl. No.: 13/776,387

(22) Filed: Feb. 25, 2013

(65) Prior Publication Data

US 2014/0238493 A1 Aug. 28, 2014

(51) Int. Cl.
*F16K 17/36* (2006.01)

(52) U.S. Cl.
CPC ............ *F16K 17/366* (2013.01); *F16K 17/363* (2013.01)

(58) Field of Classification Search
USPC .......................... 137/38, 39, 45; 251/74, 303
See application file for complete search history.

(56) References Cited

U.S. PATENT DOCUMENTS

| 1,742,685 | A | * | 1/1930 | Brandon | .................. 137/38 |
|-----------|---|---|--------|---------|-----|
| 4,603,591 | A | * | 8/1986 | Sibley et al. | ............... 74/2 |
| 4,867,209 | A | * | 9/1989 | Santoiemmo | ............ 141/19 |
| 6,283,448 | B1 | * | 9/2001 | Denton et al. | ......... 251/308 |
| 6,394,122 | B1 | | 5/2002 | Sibley et al. | |
| 6,502,599 | B1 | | 1/2003 | Sibley et al. | |
| 6,527,004 | B1 | | 3/2003 | Sibley et al. | |
| 6,926,025 | B1 | | 8/2005 | Sibley et al. | |

* cited by examiner

*Primary Examiner* — Kevin Murphy
*Assistant Examiner* — R. K. Arundale
(74) *Attorney, Agent, or Firm* — Vic Y. Lin; Innovation Capital Law Group, LLP

(57) ABSTRACT

A gas shut-off valve assembly designed to automatically close gas flow in a gas conduit in response to a seismic vibration comprises a trigger mechanism disposed in a trigger mechanism housing, a springless sealing mechanism disposed in a valve housing, a latching mechanism configured to engage the springless sealing mechanism to keep the gas conduit open, and a pressure release valve. Upon sensing a seismic vibration, the trigger mechanism disengages the springless sealing mechanism from the latching mechanism. Simultaneously, the springless sealing mechanism swings down and rotates around an axis by gravitational force to close off gas flow in the conduit. To reopen gas flow, the pressure release valve is actuated to relieve accumulated gas pressure inside the valve housing and the springless sealing mechanism is manually reset to its original open position.

19 Claims, 14 Drawing Sheets

SEISMICALLY ACTIVATED GAS SHUT-OFF VALVE

BACKGROUND OF THE INVENTION

1. Field of the Invention

The present invention relates to a gas shut-off valve assembly that automatically closes off gas flow in a gas conduit in response to a seismic vibration to prevent undesired gas leakage. The assembly remains closed until manually reset to its original open position.

The present invention also relates to a method of automatically maintaining a gas conduit in a closed position in response to a seismic vibration using a gas shut-off valve assembly to prevent undesired gas leakage.

2. Description of Prior Art and Related Information

Thousands of earthquakes occur around the world every year. Although most of the earthquakes are unnoticed because they are too weak on the Richter scale or occur in the remote areas of the world, major earthquakes are known to cause devastating damages that often result in the loss of life and property. In many cases, the damages are caused by destructive fires that break out uncontrollably due to ruptured gas pipes. For example, the major San Francisco earthquake of 1906 ruptured the city's main gas lines, destroying over 80% of the city and killing over 3,000 people due to devastating fires that lasted for days.

Various methods to shut off gas flow in conduits and pipelines in response to earthquake vibrations are known in the art. These methods generally share the common features of placing a gas valve in a section of a gas pipeline, maintaining the gas valve in an initial open position, and triggering the gas valve to close the flow of gas in the pipeline upon sensing significant seismic forces.

Typically, the gas valve used for such purposes rotates around an axis and operates in a manner similar to a flapper, such that when an earthquake occurs, the valve is triggered to swing downward and close the section of the pipeline to cut off gas flow. However, the gas valves known in the art use the assistance of a spring mechanism to push down on the valve to close the valve and maintain the section of the pipeline closed. Over time, the spring loses its rigidity and fails to maintain the section of the pipeline closed, resulting in unwanted gas leakage.

The object of the present invention is to provide a springless gas valve assembly that automatically shuts off gas flow in a gas pipeline upon a significant seismic vibration until the valve is manually reset to its original open position, thereby reducing the occurrences of gas leakage commonly associated with spring failure in conventional gas valves.

BRIEF SUMMARY OF THE INVENTION

The present invention provides devices and methods of automatically maintaining a gas conduit in a closed position in response to a seismic vibration without the use of a spring mechanism to reduce or prevent gas leakage.

In one aspect, a seismically activated gas shut-off valve assembly adapted to automatically maintain a gas conduit in a closed position in response to a seismic vibration is provided. The assembly comprises a trigger mechanism, a trigger mechanism housing, a flapper assembly rotatable around a horizontal axis, a valve housing, a latching mechanism, a valve housing cover and a pressure release valve. The trigger mechanism further comprises a weight platform, a weight and a vertically movable trigger bar initially in an upward position. The weight is placed on the weight platform. The latching mechanism is configured to receive the flapper assembly to initially maintain the flapper assembly in an open position and support the trigger bar in the upward position. Upon a seismic vibration, the weight resting on the weight platform can move in any direction, bounce off the inner walls of the trigger mechanism housing and inevitably land on the trigger bar, thereby pushing the trigger bar downward. Upon being pushed downward, the trigger bar simultaneously forces the latching mechanism to disengage the flapper assembly and allow the flapper assembly to swing downward by gravity and close off gas flow. To reopen gas flow, gas pressure is first relieved by actuating the pressure release valve. Subsequently, the flapper assembly is manually reattached to the latching mechanism, and the trigger bar is manually reset to its original upward position.

In another aspect, a seismically activated gas shut-off valve assembly adapted to automatically maintain a gas conduit in a closed position in response to a seismic vibration is provided. The assembly comprises a trigger mechanism, a trigger mechanism housing, a springless sealing mechanism, a valve housing, a latching mechanism, a valve housing cover and a pressure release valve. The springless sealing mechanism further comprises a flapper assembly attached to a parallel flat member having a latching shaft on one end and a reset shaft on the other end, wherein the flapper assembly and the parallel flat member are rotatable around a horizontal axis of the reset shaft. The trigger mechanism further comprises a weight platform, a weight and a vertically movable trigger bar initially in an upward position. The weight is placed on the weight platform. The latching mechanism is configured to receive the latching shaft to initially maintain the flapper assembly in an open position and support the trigger bar in the upward position. Upon a seismic vibration, the weight resting on the weight platform can move in any direction, bounce off the inner walls of the trigger mechanism housing and inevitably land on the trigger bar, thereby pushing the trigger bar downward. Upon being pushed downward, the trigger bar simultaneously forces the latching mechanism to disengage the latching shaft of the flapper assembly and allow the flapper assembly to swing downward by gravity and close off gas flow. To reopen gas flow, gas pressure is first relieved by actuating the pressure release valve. Subsequently, the latching shaft of the flapper assembly is manually reattached to the latching mechanism, and the trigger bar is manually reset to its original upward position.

In yet another aspect, a method of automatically maintaining a gas conduit in closed position in response to a seismic vibration using a gas shut-off valve assembly is provided. The method comprises placing the gas shut-off valve assembly in a section of the gas conduit, providing a trigger mechanism that positions a weight onto a weight platform adjacent to a vertically movable trigger that is initially in an upward position, enclosing the trigger mechanism within a trigger mechanism housing that allows the weight to be vertically displaceable, providing a springless sealing mechanism that closes off gas flow due to a seismic vibration, disengaging the springless sealing mechanism to close off gas flow, and resetting the springless sealing mechanism to its original position by manual operation.

DETAILED DESCRIPTION OF THE PREFERRED EMBODIMENTS

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

Throughout the specification, positional and directional terms below refer to the following:

"Top" shall refer to the side or direction in which a trigger mechanism housing of a gas shut-off valve assembly is located.

"Bottom" shall refer to the side or direction in which a valve housing of the gas shut-off valve assembly is located.

Figure 1:
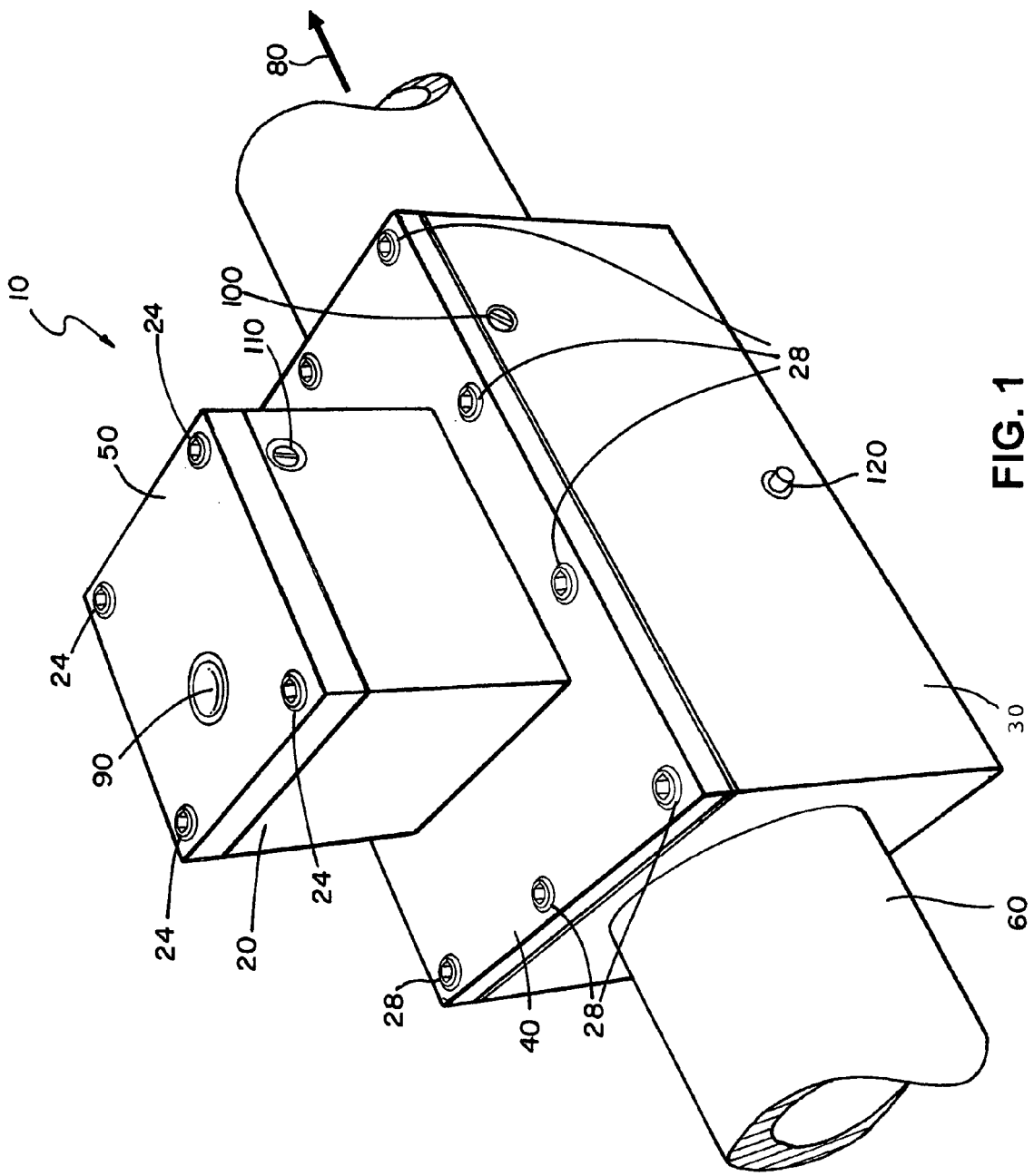
FIG. 1 is an exterior perspective view of a preferred embodiment of a seismically activated gas shut-off valve assembly.

In FIG. 1, a preferred embodiment of a seismically activated gas shut-off valve assembly, or simply a gas shut-off valve assembly, is designated by a reference numeral 10. Here, an exterior perspective view of the gas shut-off valve assembly is shown. As illustrated in FIG. 1, the gas shut-off valve assembly 10 is placed in a section of a conduit 60, wherein gas flow goes in a direction illustrated by a reference numeral 80. According to a preferred embodiment, the gas shut-off valve assembly 10 generally comprises a trigger mechanism 12 (not shown in FIG. 1), a trigger mechanism housing 20 enclosing the trigger mechanism 12, a latching mechanism 44 (not shown in FIG. 1), a springless sealing mechanism 58 (not shown in FIG. 1), and a valve housing 30 enclosing the latching mechanism 44 and the springless sealing mechanism 58. The trigger mechanism housing 20 further comprises a trigger mechanism housing cover 50 and a monitoring glass window 90 on the trigger mechanism housing cover 50 that allows the inside chamber of the trigger mechanism housing 20 to be visible from outside. The trigger mechanism housing cover 50 is secured to the trigger mechanism housing 20 by a first set of securing means 24. The valve housing 30 further comprises a valve housing cover 40 secured to the valve housing 30 by a second set of securing means 28. A third set of securing means 29 (not shown) attaches the trigger mechanism housing 20 to the valve housing cover 40. A manual reset turn screw 100 and a pressure release valve button 120 are provided outside of the valve housing 30 to allow the springless sealing mechanism 58 to be reopened manually, which will be discussed in further details below. Additionally, a horizontal trigger shaft turn screw 110 is also provided outside of the trigger mechanism housing 20 to allow the trigger mechanism, and consequently the springless sealing mechanism 58, to be manually actuated if needed, which will be discussed in further details below.

Figure 2:
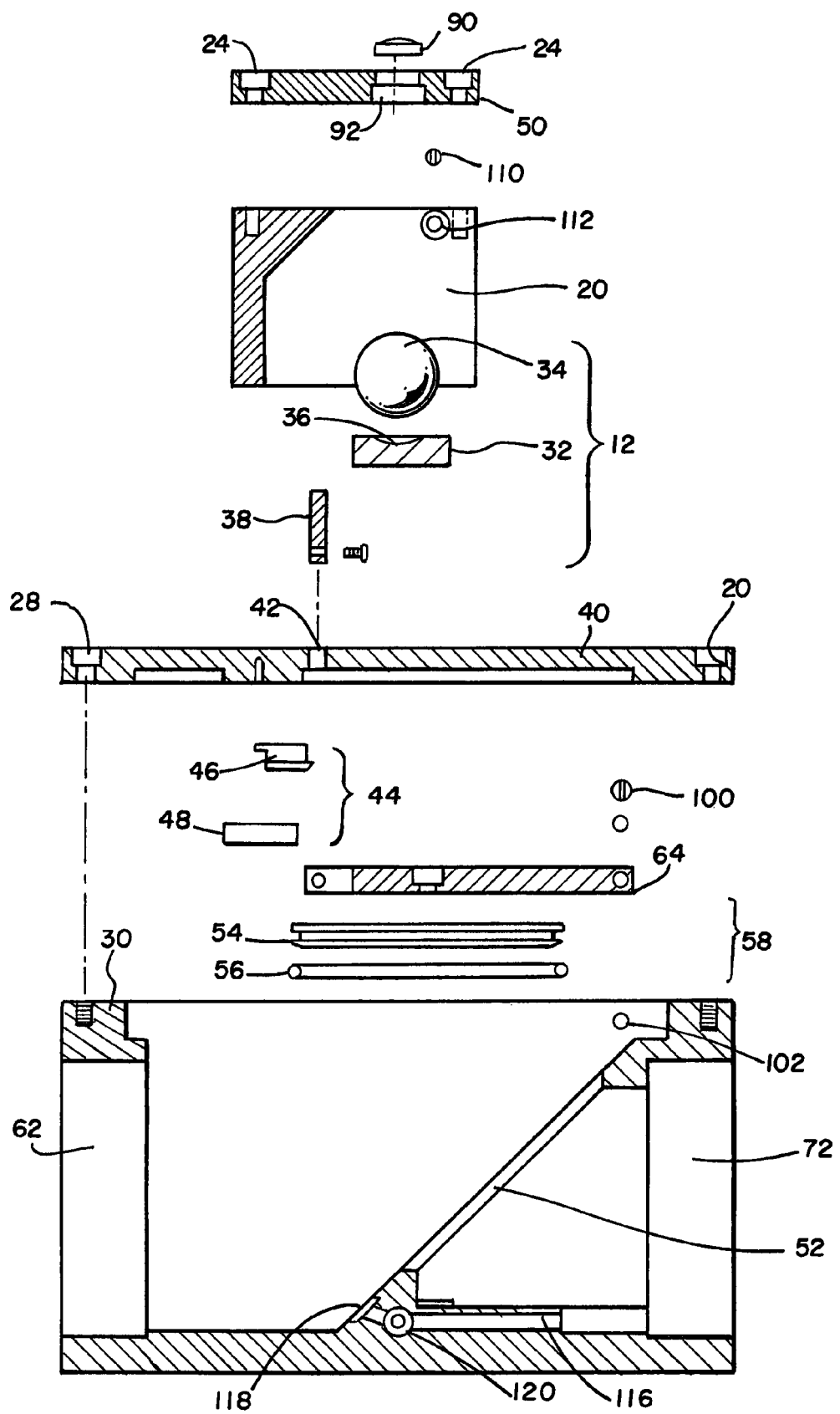
FIG. 2 is an exploded, cross sectional side view of the preferred embodiment of the gas shut-off valve assembly.

FIG. 2 illustrates an exploded, cross sectional side view of the preferred embodiment of the gas shut-off valve assembly 10. As shown, the trigger mechanism 12 further comprises a weight 34, a weight platform 32 and a vertically movable trigger bar 38. The weight platform 32 is secured to the valve housing cover 40 by a fourth set of securing means 25 (not shown in FIG. 2). According to the preferred embodiment, the weight 34 further comprises a metal ball of sufficient weight that allows it to steadily rest on the weight platform 32. The weight platform 32 is preferably semicircular with a recess 36 in the center, such that the bottom contour of the weight 34 is flush with the recess 36 when the weight 34 is placed on the weight platform 32. This configuration further assists the weight 34 to steadily rest on the weight platform 32 and move only upon a significant seismic vibration.

FIG. 2 also illustrates in greater detail the trigger mechanism housing 20 enclosing the trigger mechanism 12. As shown here and in FIG. 1, the trigger mechanism housing 20 comprises the trigger mechanism housing cover 50 which is secured to the trigger mechanism 20 by the second set of securing means 24. The trigger mechanism housing cover 50 further comprises the monitoring glass window 90 covering an aperture 92 that allows the inside chamber of the trigger mechanism housing 20 to be visible. Thus, the position of the weight 34 inside the trigger mechanism housing 20 (e.g., whether the weight 34 has been displaced from the weight platform 32) can be easily determined without the need to disassemble the trigger mechanism housing cover 50 from the trigger mechanism housing 20. From looking at the position of the weight 34 inside the trigger mechanism 20, one can easily determine whether the springless sealing mechanism 58 is in an open or closed position. As mentioned above, the horizontal trigger shaft turn screw 110 is provided outside of the trigger mechanism housing 20, wherein the trigger shaft turn screw 110 can be rotated manually around an axis of rotation 112 to allow the weight 34 to be displaced from the weight platform 32 without a seismic vibration.

The valve housing cover 40 is secured to the valve housing 30 by the second set of securing means 28. The trigger bar 38 is vertically movable along a slot 42 in the valve housing cover 40. The latching mechanism 44 is attached to the valve housing cover 40 by a fifth set of securing means 31 (not shown). The latching mechanism 44 further comprises a horizontally movable latch member 46 and a fixed latch member housing 48, wherein the movable latch member 46 can move in and out of the latch member housing 48 in a horizontal direction. In a preferred embodiment, the latching mechanism 44 further comprises a latch spring 47 (not shown) enclosed within the latch member housing 48, having one end abutting an inner wall of the latch member housing 48 and another end abutting the movable latch member 46, such that the latch member 46 protrudes outward due to the force exerted by the latch spring 47 in the default position.

As shown in FIG. 2, a springless sealing mechanism 58 is provided. According to a preferred embodiment, the springless sealing mechanism 58 comprises a circular disk 54 and an annular O-ring gasket 56 enclosing the edge of the circular disk 54 to ensure maximum sealing. In yet another preferred embodiment, the springless sealing mechanism 58 further comprises a parallel flat member 64 attached to the disk 54, wherein the flat member has a latching shaft 66 on one end (not shown in FIG. 2) and a reset shaft 68 on the other end (not shown in FIG. 2). The springless sealing mechanism 58 is rotatable around a horizontal axis 102 in clockwise and counterclockwise directions. In an open position, the springless sealing mechanism 58 is in an upward position wherein the disk 54 is held up by the latching mechanism 44, thereby allowing gas to flow from a threaded inlet opening 62, through a valve opening 52 and out of a threaded outlet opening 72. In a closed position, the disk 54 swings down and closes the valve opening 52, thereby blocking incoming gas flow from the inlet opening 62. To reopen the disk 54, the pressure release valve button 120 is pushed to open a pressure release valve 118 and allow accumulated incoming gas pressure to be relieved through a pressure release valve channel 116 on the other side of the disk 54. Subsequently, the disk 54 is rotated around the horizontal axis 102 back to its upward position by actuating the manual reset turn screw 100.

Figure 3:
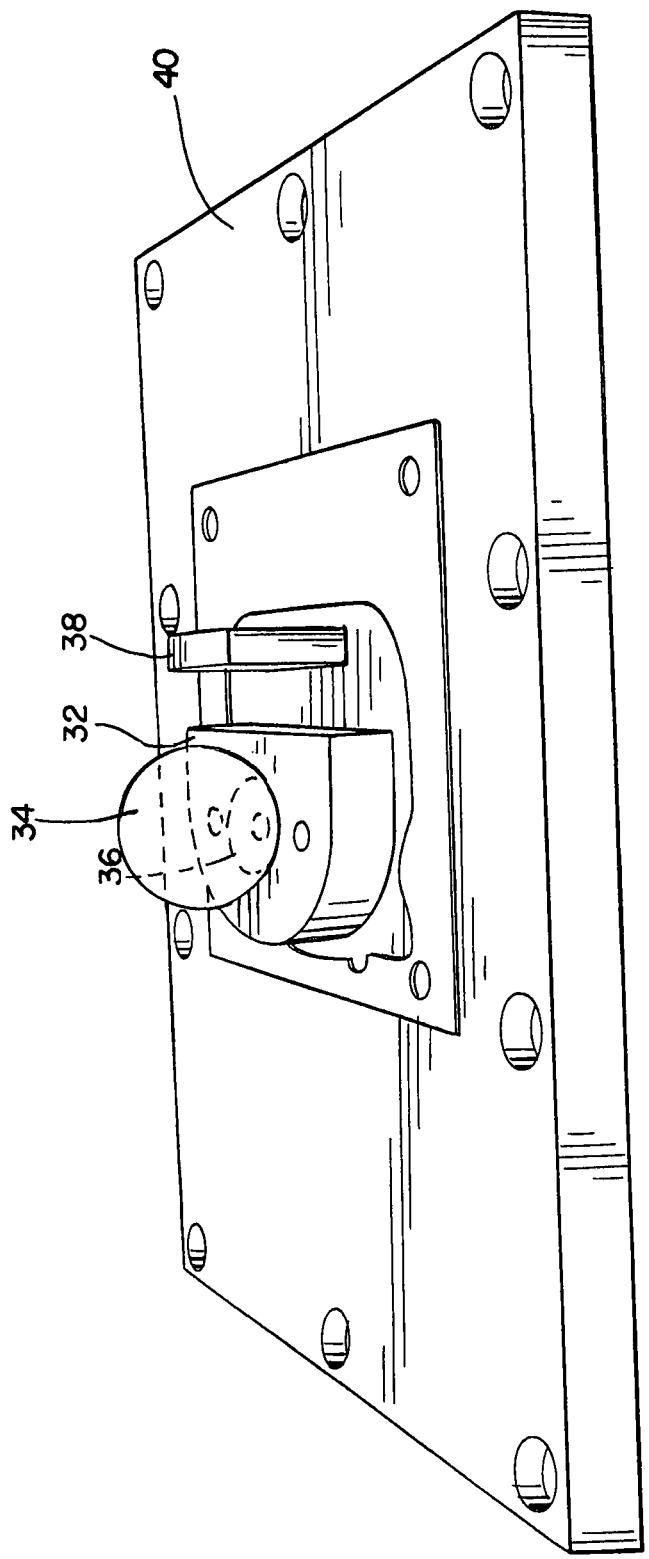
FIG. 3 is a perspective view of a preferred embodiment of a trigger mechanism without a trigger mechanism housing of the gas shut-off valve assembly.
Figure 4:
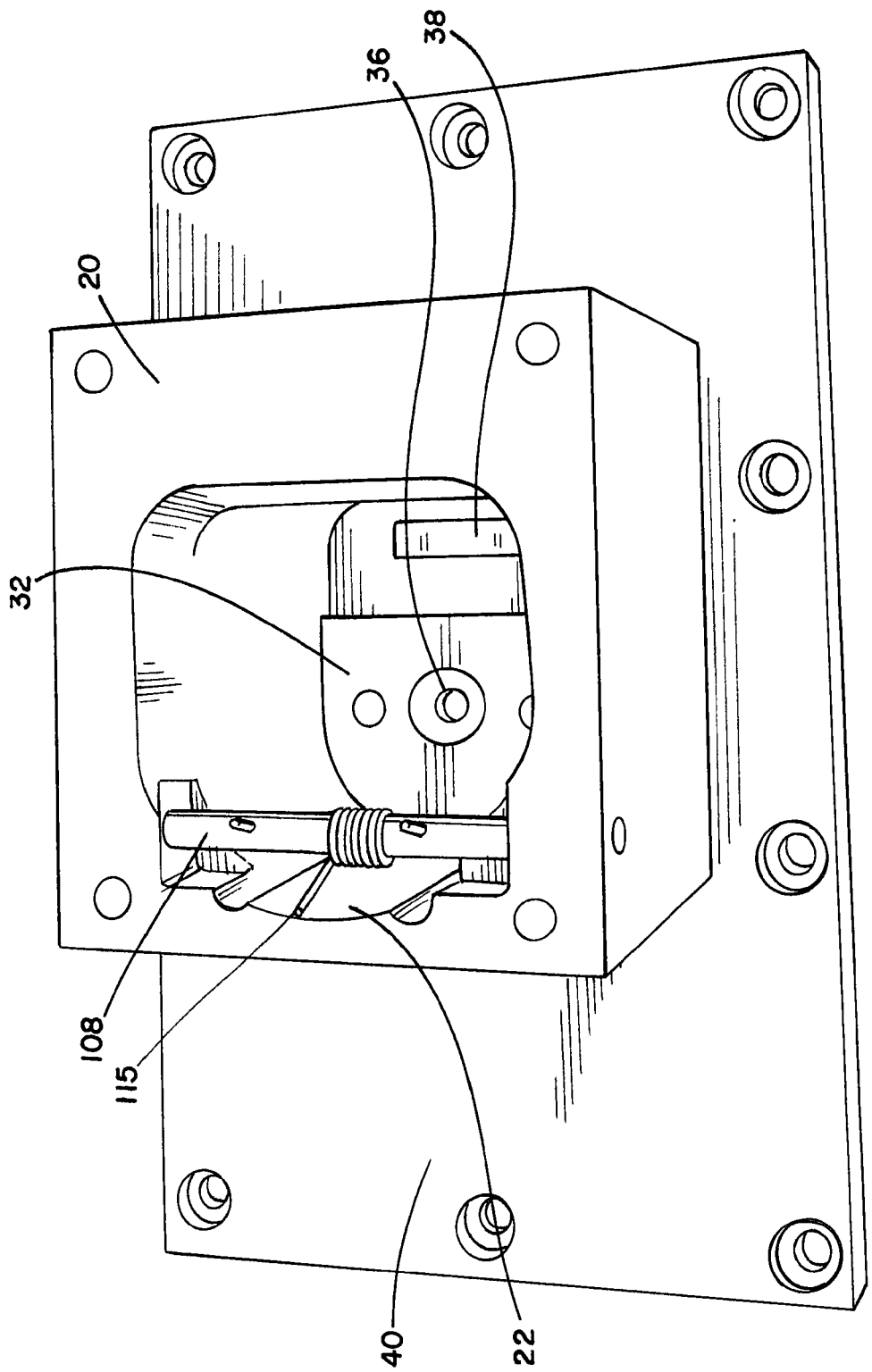
FIG. 4 is a perspective view of the trigger mechanism enclosed in the trigger mechanism housing of the gas shut-off valve assembly.
Figure 5:
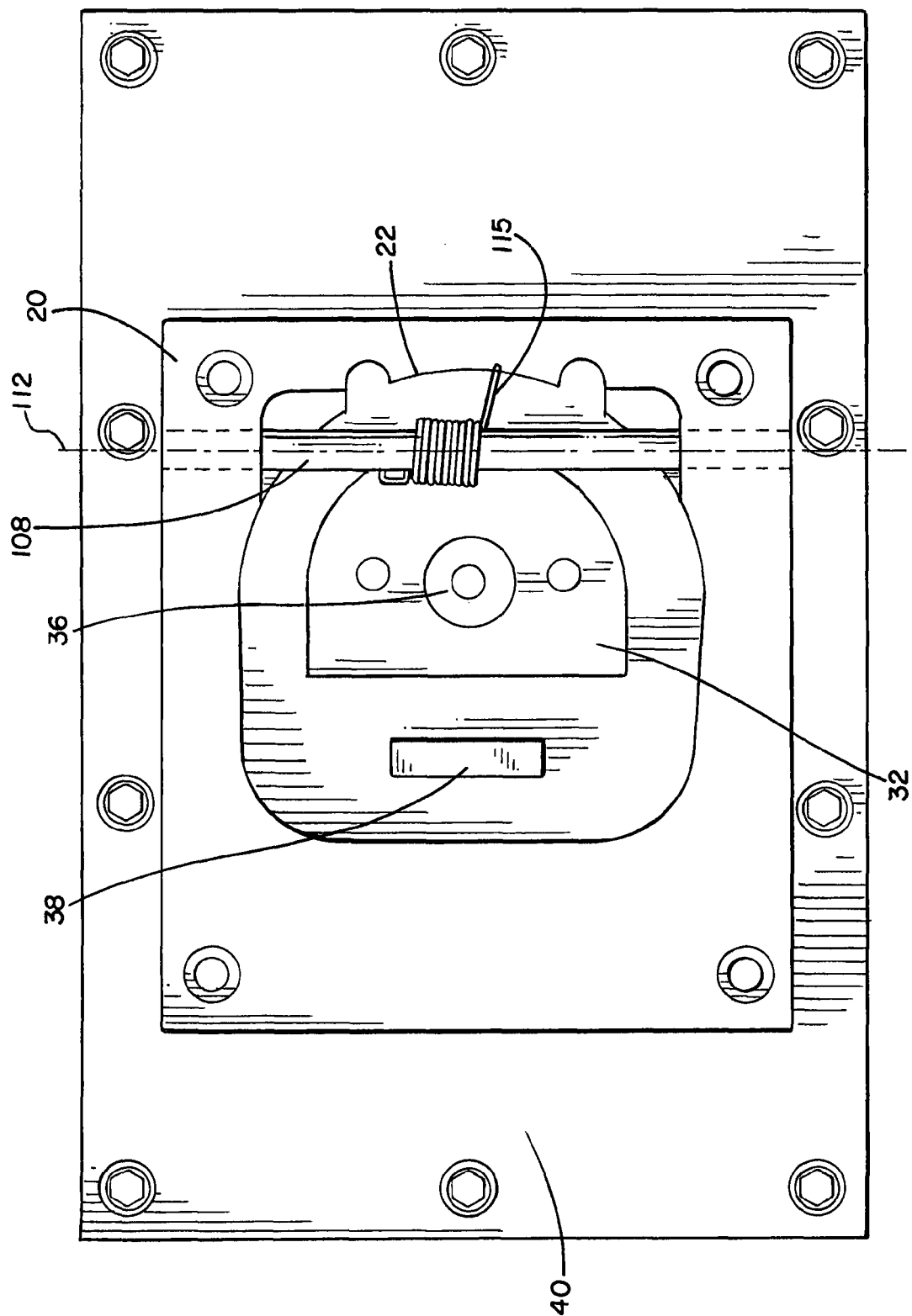
FIG. 5 is a top view of the trigger mechanism enclosed in the trigger mechanism housing.

FIG. 3 demonstrates a perspective view of the trigger mechanism 12 in its initial position. As shown without the trigger mechanism housing 20, the weight 34 is initially placed on the weight platform 32, wherein the bottom contour of the weight 34 is flush with the recess 36 on the weight platform 32. The weight platform 32 is securely affixed to the valve housing cover 40. The vertically movable trigger bar 38 is adjacent to the weight 34 and the weight platform 32, configured to be initially in an upward position.

Figure 6:
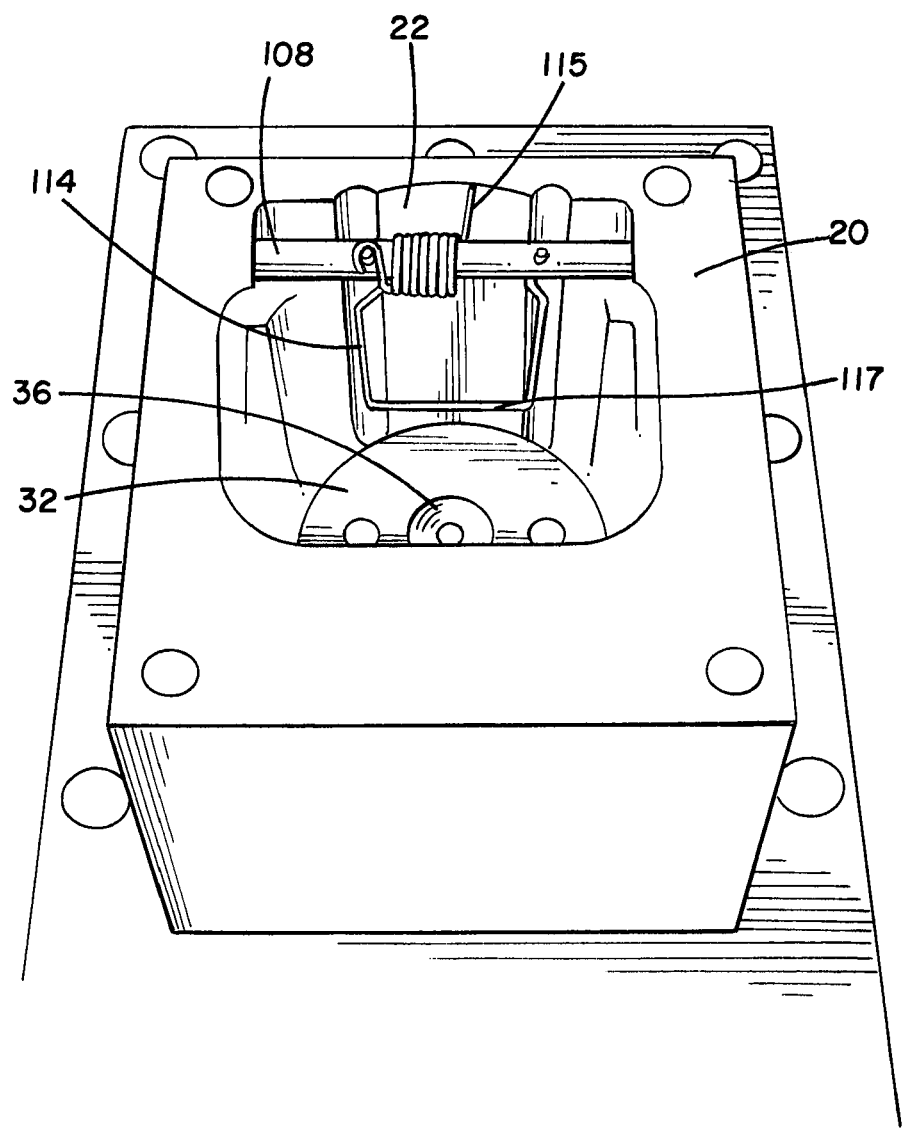
FIG. 6 is a perspective front view of the trigger mechanism in its initial position.
Figure 7:
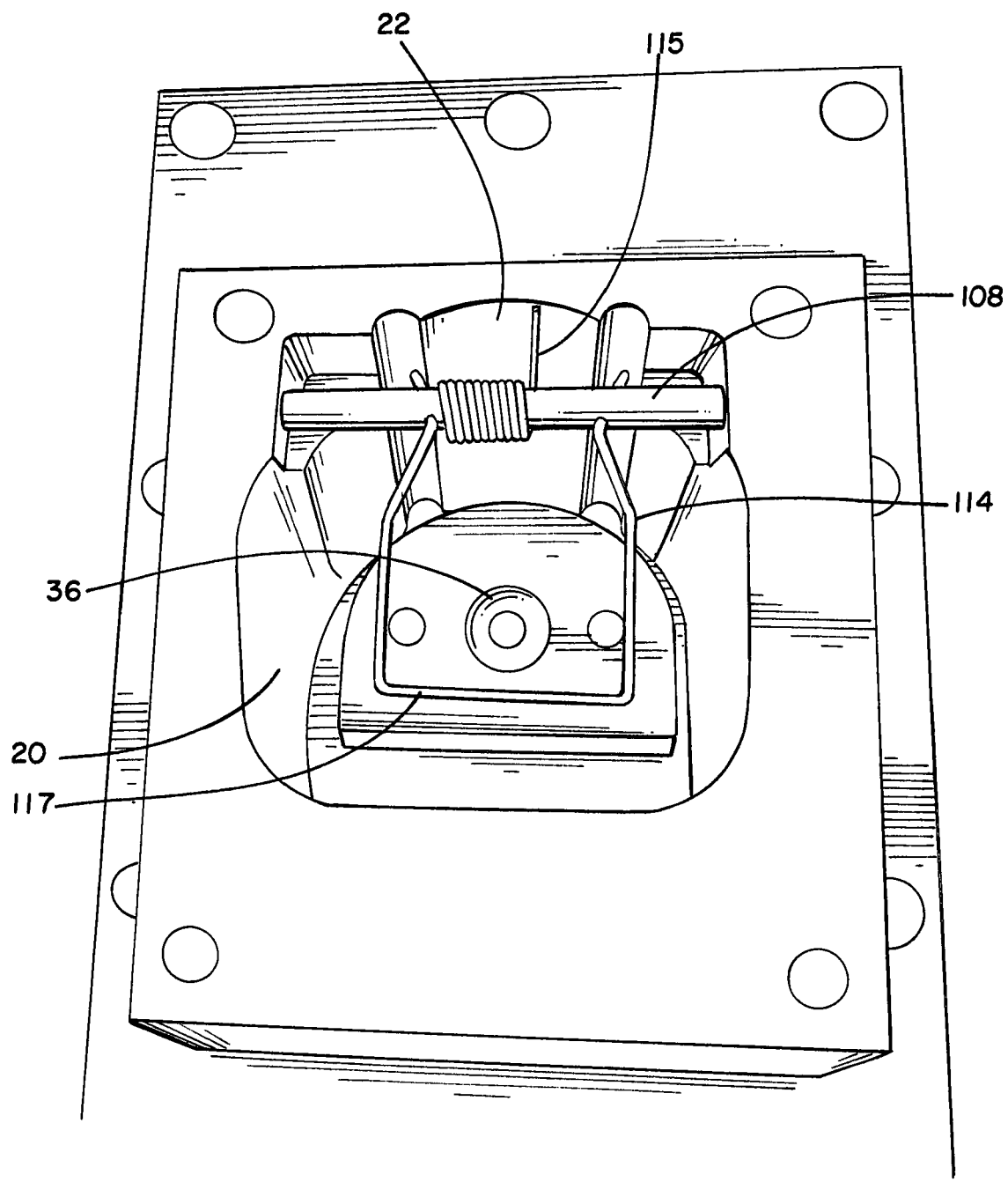
FIG. 7 is a perspective front view of the trigger mechanism upon manual operation to displace a weight on a weight platform of the trigger mechanism.

FIGS. 4-7 show the trigger mechanism 12 without the weight 34, enclosed within the trigger mechanism housing 20. Referring to FIGS. 4-7, it is shown that the trigger mechanism housing 20 further comprises a horizontal trigger shaft 108 having the axis of rotation 112. The horizontal trigger shaft 108 is rotatable clockwise and counterclockwise around the axis 112 by actuating the trigger shaft turn screw 110 located outside of the trigger mechanism housing 20, as shown in FIGS. 1-2. Referring to FIGS. 6-7, a wireform 114 having one rigid end 115 wrapped around the horizontal trigger shaft 108 and another elongated end 117 extending down is provided. FIG. 6 shows the wireform 114 in its default position, wherein the end 115 is configured such that its tip abuts an adjacent inner wall 22 of the trigger housing 20, thereby forcing the wireform 114 to touch the adjacent inner wall 22. In cross reference to FIG. 3, when the weight 34 is placed on the weight platform 32, the weight 34 is adjacent to the elongated end 117 of the wireform 114. In the event that the trigger mechanism 12 needs to be manually actuated, the trigger shaft 108 can be rotated around the axis 112 by actuating the turn screw 110, such that the wireform 114 consequently rotates in a direction away from the inner wall 22 and the elongated end 117 pushes the weight 34 to fall off the weight platform 32 and onto the trigger bar 38. The trigger bar 38 subsequently moves downward upon bearing the weight 34 on top of it and disengages the springless sealing mechanism 58, as will be discussed further below.

Figure 8:
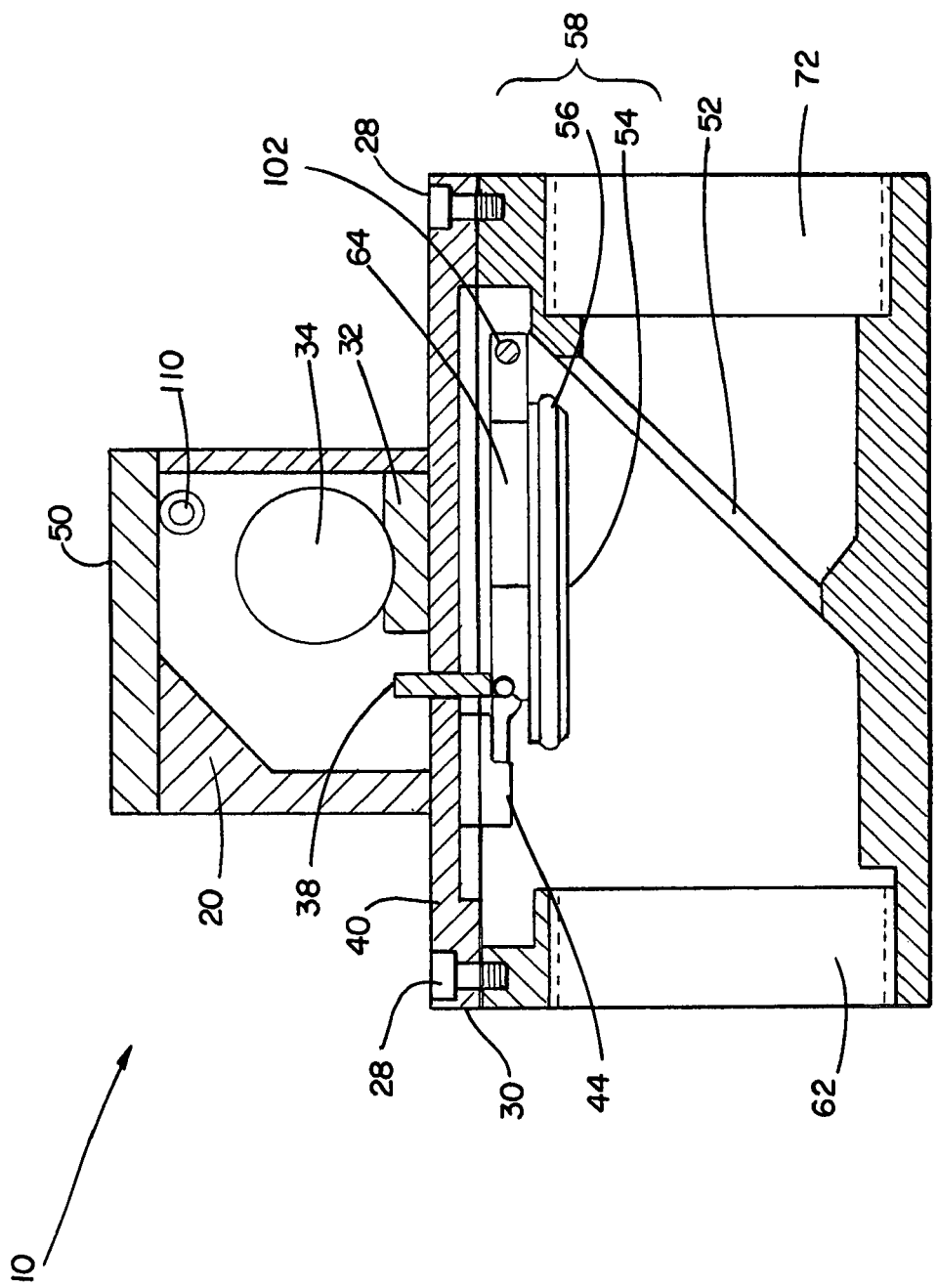
FIG. 8 is a cross sectional side view of the gas shut-off assembly in its initial position.
Figure 9:
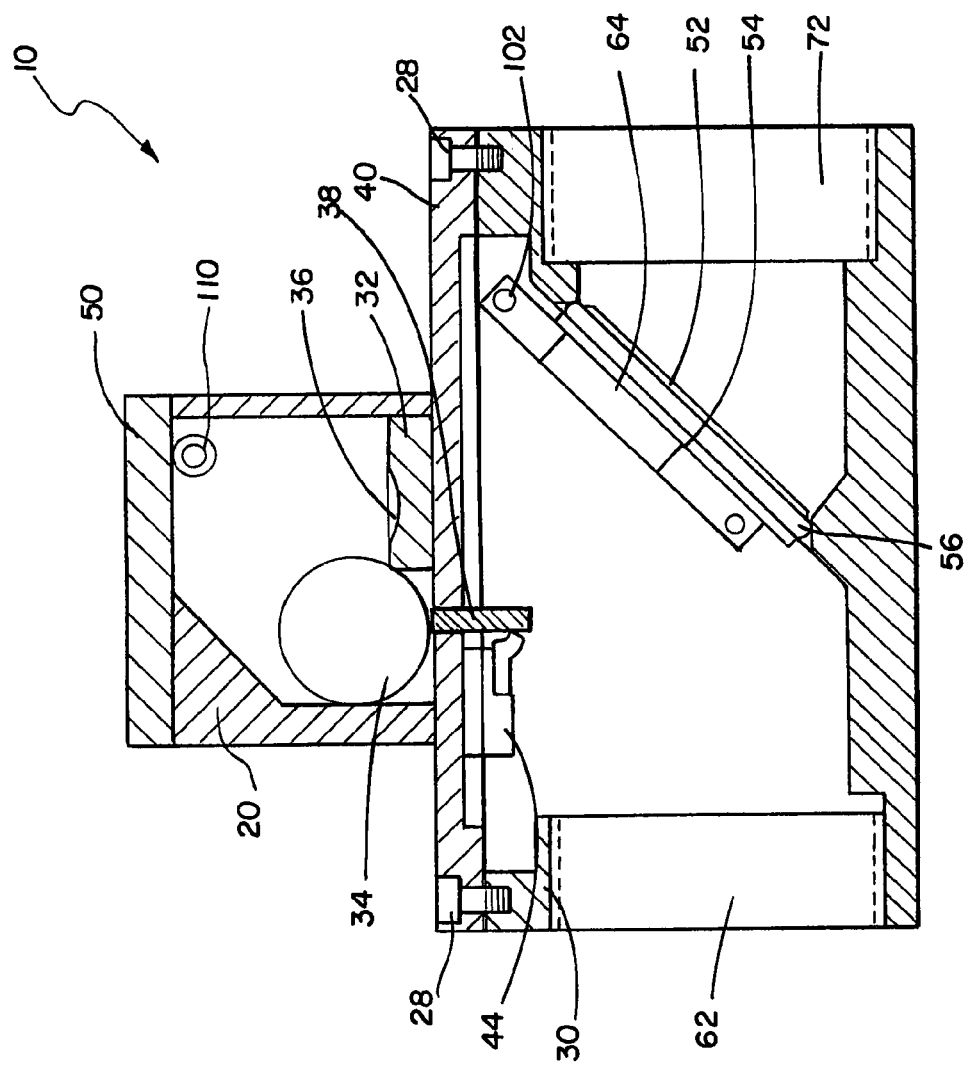
FIG. 9 is a cross sectional side view of the gas shut-off assembly upon sensing and in response to a seismic vibration.

FIGS. 8 and 9 demonstrate the principles of operation of the gas shut-off valve assembly 10. FIG. 8 shows the gas shut-off valve assembly 10 in its initial open position. Incoming fluid gas flows from the inlet opening 62, through the valve opening 52 and out of the outlet opening 72. The weight 34 is initially rested on the weight platform 32 inside the trigger mechanism housing 20. The latching mechanism 44 is configured to receive the springless sealing mechanism 58, including the disk 54, and maintain it in an upward position to keep the valve opening 52 open. The springless sealing mechanism 58 abuts the lower portion of the trigger bar 38, and consequently pushes up the trigger bar 38 along the slot 42 upon being latched to the latching mechanism 44.

FIG. 9 illustrates the gas shut-off assembly 10 in response to a seismic vibration. Upon a significant seismic vibration, the weight 34 bounces off the inner walls of the trigger mechanism housing 20 in any direction, eventually becomes vertically displaced from the weight platform 32, and lands on the trigger bar 38. Upon being pushed by the weight 34, the trigger bar 38 then drops down along the slot 42 and exerts force to push the springless sealing mechanism 58 down. Upon being pushed down, the springless sealing mechanism 58 simultaneously forces the latching mechanism 44 to disengage. By gravitational force, the springless sealing mechanism 58 swings down, rotates around the horizontal axis 102 in the direction away from the valve housing cover 40 and closes off the valve opening 52. The valve opening 52 remains closed until the reset turn screw 100 is manually actuated to swing the springless sealing mechanism 58 up and around the horizontal axis 102 in the direction toward the valve housing cover 40. The springless sealing mechanism 58 is relatched to the latching mechanism 44, the trigger bar 38 is manually pushed back to its upward position and the weight 34 is reseated onto the weight platform 32 upon being pushed by the trigger bar 38. The valve opening 52 is once again reopened to allow gas flow from the inlet opening 62, through the valve opening 52 and out of the outlet opening 72.

Figure 10:
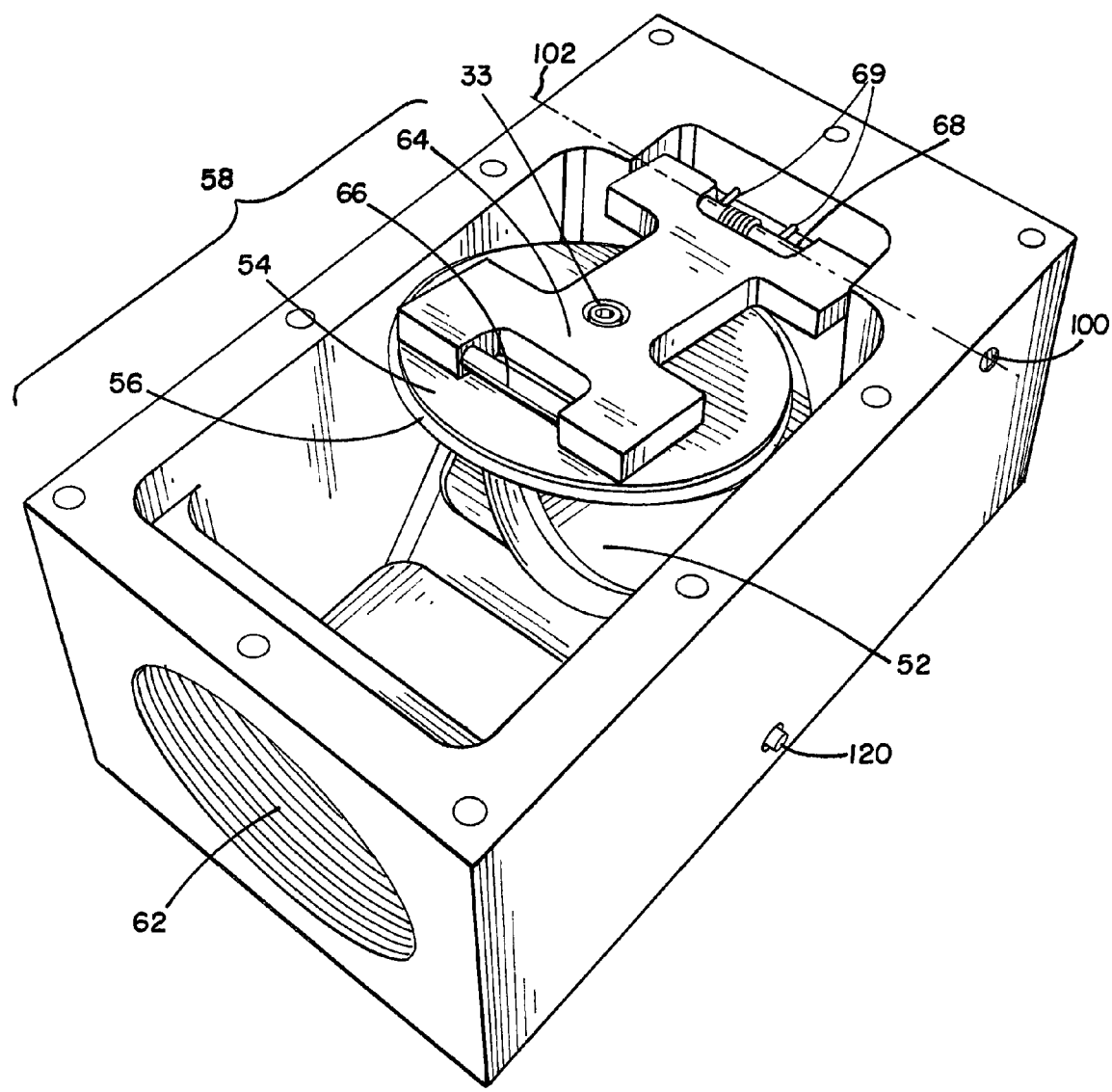
FIG. 10 is perspective view of a preferred embodiment of a springless sealing mechanism of the gas shut-off valve assembly in its initial open position.
Figure 11:
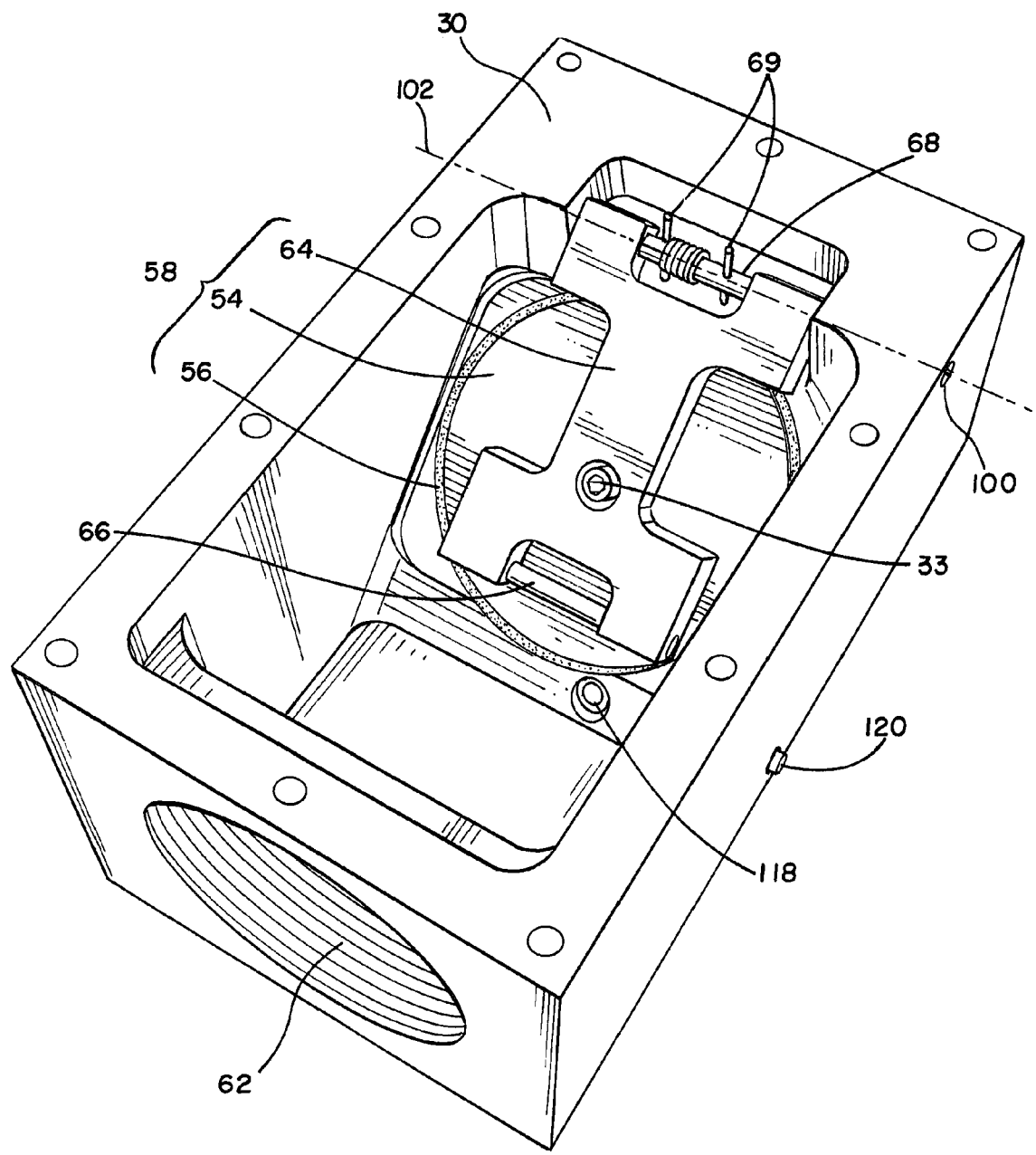
FIG. 11 is a perspective view of the springless sealing mechanism in a closed position upon sensing and in response to the seismic vibration.

FIGS. 10 and 11 illustrate a preferred embodiment of the springless sealing mechanism 58 with the parallel flat member 64 attached. Referring to FIGS. 10 and 11, it is shown that the parallel flat member 64 is secured to the disk 54 by a sixth set of securing means 33. As discussed above, preferably the disk 54 is circular and enclosed with the annular O-ring gasket 56 to provide better sealing of the valve opening 52. As demonstrated in FIGS. 10-11, the parallel flat member 64 further comprises the latching shaft 66 and the reset shaft 68. The reset shaft 68 is connected to the valve housing 30 and rotatable around the horizontal axis 102. A pair of reset shaft pins 69 is provided on the reset shaft 68 and intersects the horizontal axis 102. The reset turn screw 100 is connected to the reset shaft 68 to allow the springless sealing mechanism 58 to be manually rotated around the horizontal axis 102.

FIG. 10 illustrates the springless sealing mechanism 58 in its initial position. In cross reference to FIGS. 2 and 8, in its initial position, the movable latch member 46 of the latching mechanism 44 is configured to receive the latching shaft 66, thereby keeping the disk 54 in the upward position and maintaining incoming fluid gas to flow from the inlet opening 62 through the valve opening 52. Upon sensing a seismic vibration, the trigger mechanism 12 is actuated, disengaging the latching shaft 66 from the latch member 46 and releasing the springless sealing mechanism 58. By gravitational force, the springless sealing mechanism 58 swings down and the reset shaft 68 rotates around the horizontal axis 102 to close off the valve opening 52, as shown in FIG. 11. To reopen the valve opening 52, accumulated gas pressure is relieved by actuating the pressure release valve button 120 to open the pressure release valve 118 and the springless sealing mechanism 58 is manually reset by actuating the reset turn screw 100 to rotate the reset shaft 68 in the direction toward the valve housing cover 40. As the reset shaft 68 rotates around the horizontal axis 102, the pair of reset shaft pins 69 turns in the same direction, wherein the tips of the reset shaft pins 69 begin to push on one end of the parallel flat member 64. Consequently, the reset shaft pins 69 push up on the parallel flat member 64 and the attached circular disk 54. The latching shaft 66 is relatched to the movable latch member 46, the trigger mechanism 12 is reset to its original position as described above, and the valve opening 52 is once again reopened to allow gas flow.

Figure 12:
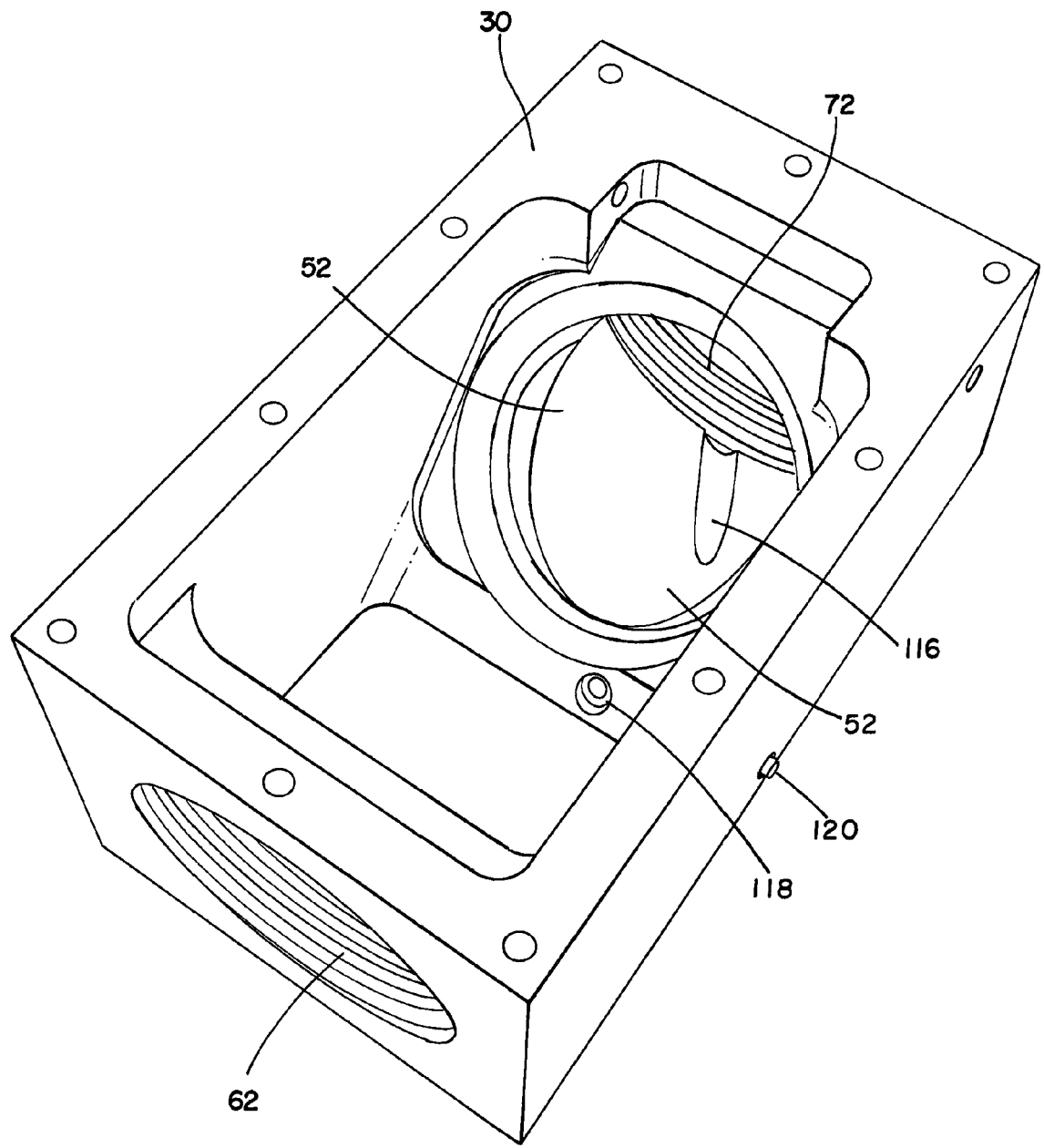
FIG. 12 is perspective view of a preferred embodiment of a valve housing of the gas shut-off valve assembly further comprising a pressure release valve.
Figure 13:
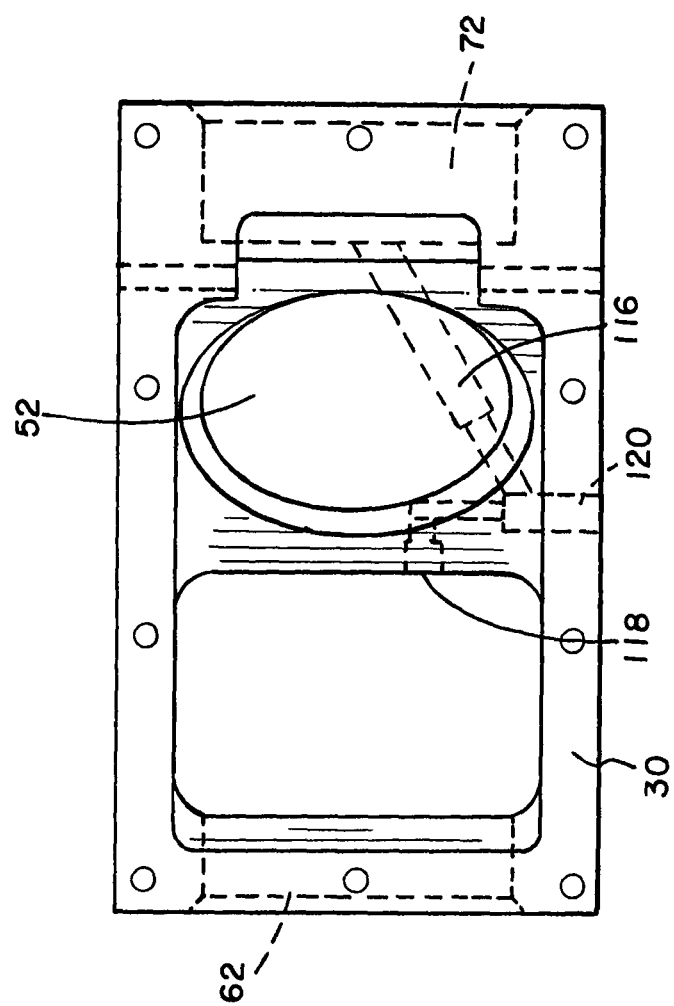
FIG. 13 is a cross sectional top view of the valve housing showing the pressure release valve.

FIGS. 12 and 13 illustrate the principles of operation of relieving accumulated gas pressure prior to manually reopening the gas shut-off valve assembly 10. As discussed, fluid gas flows from the inlet opening 62 through the valve opening 52 and out of the outlet opening 72. As gas flow is completely blocked by disk 54 when the springless sealing mechanism 58 is in the closed position, gas pressure accumulates and exerts force on the disk 54 to further maintain the valve opening 52 closed. To reopen the valve opening 52 and rotate the springless sealing mechanism 58 in the direction against the opposing gas pressure, gas pressure is relieved by actuating the pressure release valve button 120 to open the pressure release valve 118 and allowing gas pressure to escape through the pressure release valve channel 116. Consequently, accumulated gas pressure escapes on the other side of the disk 54 and out of the outlet opening 72, thereby allowing the springless sealing mechanism 58 to be reset to its original position.

Figure 14:
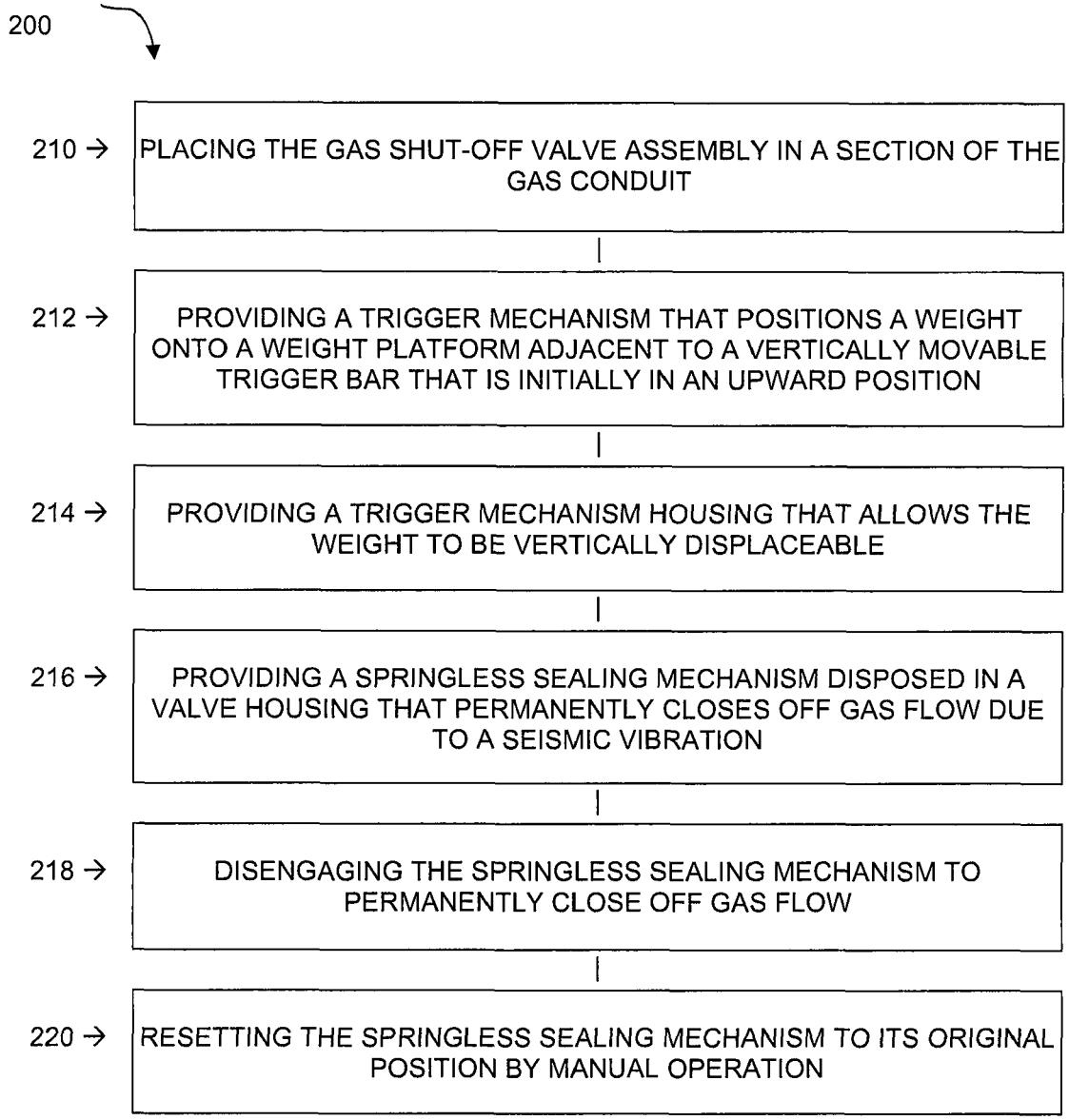
FIG. 14 is a diagram of a preferred method of automatically maintaining a gas conduit in a closed position in response to a seismic vibration using a gas shut-off valve assembly.

FIG. 14 illustrates a preferred method 200 of automatically maintaining a gas conduit in a closed position in response to a seismic vibration using a gas shut-off valve assembly. The method 200 comprises a step 210 of placing the gas shut-off valve assembly in a section of the gas conduit, a step 212 of providing a trigger mechanism that positions a weight onto a weight platform adjacent to a vertically movable trigger bar that is initially in an upward position, a step 214 of providing a trigger mechanism housing that allows the weight to be vertically displaceable, a step 216 of providing a springless sealing mechanism enclosed in a valve housing that closes off gas flow due to a seismic vibration, a step 218 of disengaging the springless sealing mechanism to close off gas flow, and a step 220 of resetting the springless sealing mechanism to its original position by manual operation.

The step 212 of providing a trigger mechanism that positions a weight onto a weight platform adjacent to a vertically movable trigger bar that is initially in an upward position comprises securing the weight platform to an upper portion of a valve housing cover of the valve housing, placing the vertically movable trigger in a slot in the valve housing cover and securing a latching mechanism configured to initially maintain a rotatable valve in an open position and support the trigger bar in the upward position to the valve housing cover. According to a preferred method, the step 212 further comprises providing a recess in the center of the weight platform such that the bottom contour of the weight is flush with the recess when the weight is placed on the weight platform.

The step 214 of providing a trigger mechanism housing that allows the weight to be vertically displaceable comprises enclosing the weight platform, the weight and the movable trigger bar in the trigger mechanism housing and securing the trigger mechanism housing to the valve housing cover. In yet another embodiment, the step 214 further comprises providing a rotatable horizontal trigger shaft having a wireform and a trigger shaft turn screw attached to the trigger mechanism housing. In the event that the trigger mechanism needs to be manually actuated, the trigger shaft can be rotated around a rotational axis of the horizontal trigger shaft by actuating the trigger shaft turn screw, such that the wireform consequently rotates in a direction away from an inner wall of the trigger mechanism housing and the wireform pushes the weight to fall off the weight platform and onto the trigger bar. According to another preferred embodiment, the step 214 further comprises providing a monitoring glass window on the trigger mechanism housing to visually confirm whether the gas shut-off valve is either open or closed.

The step 216 of providing a springless sealing mechanism enclosed in a valve housing that closes off gas flow due to a seismic vibration comprises attaching the rotatable flapper assembly to a parallel flat member having a latching shaft on one end and an reset shaft on the other end, wherein the flapper assembly and the parallel flat member are rotatable around a horizontal axis of the reset shaft, and fastening the latching shaft to the latching mechanism. Preferably, a manual reset turn screw is attached to the reset shaft to allow the springless sealing mechanism to be manually rotated. Additionally, according to the preferred embodiment, the valve housing includes a valve opening to allow gas flow.

The step 218 of disengaging the springless sealing mechanism to close off gas flow comprises vertically displacing the weight from the weight platform onto the trigger bar upon sensing the seismic vibration, vertically pushing the trigger bar down along the slot in the valve housing cover, disengaging the latching shaft from the latching mechanism, and allowing the springless sealing mechanism to swing down by gravitational force and rotate around the horizontal axis of the reset shaft to close off the valve opening.

The step 220 of resetting the springless sealing mechanism to its original position by manual operation comprises providing a pressure release valve with operating means located outside of the valve housing, actuating the pressure release valve to relieve accumulated gas pressure, actuating the manual reset turn screw to rotate the springless sealing mechanism around the horizontal axis of the reset shaft in an upward direction toward the valve housing cover, relatching the latching shaft to the latching mechanism, and manually pushing the trigger bar back to the upward position.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what incorporates the essential idea of the invention.

What is claimed is:

1. A seismically activated gas shut-off valve assembly adapted to automatically maintain a gas conduit in a closed position in response to a seismic vibration comprising:
   a trigger mechanism disposed in a trigger mechanism housing, further comprising a weight platform, a weight, and a vertically movable trigger bar initially in an upward position, wherein the weight is initially positioned on the weight platform;
   a flapper assembly rotatable around a horizontal axis and disposed in a valve housing;
   a latching mechanism configured to engage the flapper assembly to initially maintain the flapper assembly in an open position and support the trigger bar in the upward position; and
   a pressure release valve with operating means located outside of the valve housing,
   wherein upon a seismic vibration, the weight is vertically displaced from the weight platform onto the trigger bar, thereby pushing the trigger bar downward to force the latching mechanism to disengage the flapper assembly and allow the flapper assembly to rotate downward and close off gas flow until the pressure release valve is manually actuated and the flapper assembly is manually reset to its original open position, and
   wherein the flapper assembly is further attached to a parallel flat member having a latching shaft on one end and a reset shaft on the other end, wherein the flapper assembly and the parallel flat member are rotatable around a horizontal axis of the reset shaft.

2. The gas shut-off valve assembly of claim 1, wherein the trigger mechanism housing further comprises a rotatable horizontal trigger shaft attached to a trigger shaft turn screw and a wireform adjacent to the weight, such that the weight can be manually displaced from the weight platform and actuate the trigger mechanism.

3. The gas shut-off valve assembly of claim 1, wherein the trigger mechanism housing further comprises a monitoring glass window to visually confirm whether the gas shut-off valve is either open or closed.

4. The gas shut-off valve assembly of claim 1, further comprising a turn screw located outside of the valve housing configured to manually reset the flapper assembly to its original open position.

5. The gas shut-off valve assembly of claim 1, wherein the flapper assembly further comprises a circular disk.

6. The gas shut-off valve assembly of claim 1, wherein the reset shaft further comprises a reset shaft pin that intersects the horizontal axis of the reset shaft and forces the parallel flat member and the flapper assembly to rotate upward and reopen gas flow upon manual reset.

7. A seismically activated gas shut-off valve assembly adapted to automatically maintain a gas conduit in a closed position in response to a seismic vibration comprising:
   a trigger mechanism disposed in a trigger mechanism housing, further comprising a weight platform, a weight, and a vertically movable trigger bar initially in an upward position, wherein the weight is initially positioned on the weight platform;
   a springless sealing mechanism disposed in a valve housing, further comprising a flapper assembly attached to a parallel flat member having a latching shaft on one end and an reset shaft on the other end, wherein the flapper assembly and the parallel flat member are rotatable around a horizontal axis of the reset shaft;
   a latching mechanism configured to engage the latching shaft to initially maintain the flapper assembly in an open position and support the trigger bar in the upward position; and
   a pressure release valve with operating means located outside of the valve housing,
   wherein upon a seismic vibration, the weight is vertically displaced from the weight platform onto the trigger bar, thereby pushing the trigger bar downward to force the latching mechanism to disengage the latching shaft and allow the springless sealing mechanism to rotate downward and close off gas flow until the pressure release valve is manually actuated and the springless sealing mechanism is manually reset to its original open position.

8. The gas shut-off valve assembly of claim 7, wherein the trigger mechanism housing further comprises a rotatable horizontal trigger shaft attached to a trigger shaft turn screw and a wireform adjacent to the weight, such that the weight can be manually displaced from the weight platform and actuate the trigger mechanism.

9. The gas shut-off valve assembly of claim 7, wherein the reset shaft further comprises a reset shaft pin that intersects the horizontal axis of the reset shaft and forces the parallel flat member and the flapper assembly to rotate upward and reopen gas flow upon manual reset.

10. The gas shut-off valve assembly of claim 7, wherein the flapper assembly further comprises a circular disk.

11. The gas shut-off valve assembly of claim 7, wherein the trigger mechanism housing further comprises a monitoring glass window to visually confirm whether the gas shut-off valve is either open or closed.

12. The gas shut-off valve assembly of claim 7, further comprising a turn screw located outside of the valve housing configured to manually reset the flapper assembly to its original open position.

13. The gas shut-off valve assembly of claim 7, wherein the pressure release valve further comprises a pressure release valve button and a pressure release valve channel.

14. A method of automatically maintaining a gas conduit in a closed position in response to a seismic vibration using a gas shut-off valve assembly comprising:
   placing the gas shut-off valve assembly in a section of the gas conduit;
   providing a trigger mechanism that positions a weight onto a weight platform adjacent to a vertically movable trigger bar that is initially in an upward position and allows the weight to be vertically displaceable;
   providing a trigger mechanism housing that allows the weight to be vertically displaceable and unseated from the weight platform in response to seismic vibration, the weight dropping entirely off the weight platform and onto the trigger mechanism in response to seismic vibration;

providing a springless sealing mechanism disposed in a valve housing that closes off gas flow due to a seismic vibration;

disengaging the springless sealing mechanism to close off gas flow; and resetting the springless sealing mechanism to its original position by manual operation.

15. The method of claim 14, wherein the step of providing a springless sealing mechanism disposed in a valve housing that closes off gas flow due to a seismic vibration further comprises attaching a flapper assembly to a parallel flat member having a latching shaft on one end and an reset shaft on the other end, wherein the flapper assembly and the parallel flat member are rotatable around a horizontal axis of the reset shaft.

16. The method of claim 14, wherein the step of providing a trigger mechanism housing that allows the weight to be vertically displaceable and unseated from the weight platform in response to seismic vibration, the weight dropping entirely off the weight platform and onto the trigger mechanism in response to seismic vibration further comprises providing a rotatable horizontal trigger shaft attached to a trigger shaft turn screw and a wireform adjacent to the weight, such that the weight can be manually displaced from the weight platform and actuate the trigger mechanism.

17. The method of claim 14, wherein the step of providing a trigger mechanism that positions a weight onto a weight platform adjacent to a vertically movable trigger bar that is initially in an upward position further comprises securing the weight platform to an upper portion of a valve housing cover of the valve housing, placing the vertically movable trigger in a slot in the valve housing cover and securing a latching mechanism configured to initially engage the springless sealing mechanism in an open position and support the trigger bar in the upward position to the valve housing cover.

18. The method of claim 17, wherein the step of disengaging the springless sealing mechanism to close off gas flow comprises vertically displacing the weight from the weight platform onto the trigger bar upon sensing the seismic vibration, vertically pushing the trigger bar down and disengaging the springless sealing valve mechanism from the latching mechanism, and allowing the springless sealing mechanism to swing down by gravitational force to close off a valve opening of the gas shut-off valve assembly.

19. The method of claim 17, wherein the step of resetting the springless sealing mechanism to its original position by manual operation comprises providing a pressure release valve with operating means located outside of the valve housing, actuating the pressure release valve to relieve accumulated gas pressure, actuating a manual reset turn screw to rotate the springless sealing mechanism in an upward direction toward the valve housing cover, relatching the springless sealing valve mechanism to the latching mechanism, and manually pushing the trigger bar back to the upward position.

* * * * *